Sept. 8, 1936.   C. E. BRADSHAW   2,053,812
CONNECTION MECHANISM FOR TRACTORS AND TRAILERS
Filed March 18, 1936   4 Sheets—Sheet 1

Inventor
Charles E. Bradshaw,
By Church & Church
His Attorneys

Sept. 8, 1936.  C. E. BRADSHAW  2,053,812

CONNECTION MECHANISM FOR TRACTORS AND TRAILERS

Filed March 18, 1936  4 Sheets-Sheet 2

Inventor
Charles E. Bradshaw,

By Church & Church
His Attorneys

Sept. 8, 1936. C. E. BRADSHAW 2,053,812
CONNECTION MECHANISM FOR TRACTORS AND TRAILERS
Filed March 18, 1936 4 Sheets-Sheet 3

Inventor
Charles E. Bradshaw,
By Church & Church
His Attorney

Sept. 8, 1936. C. E. BRADSHAW 2,053,812
CONNECTION MECHANISM FOR TRACTORS AND TRAILERS
Filed March 18, 1936 4 Sheets-Sheet 4
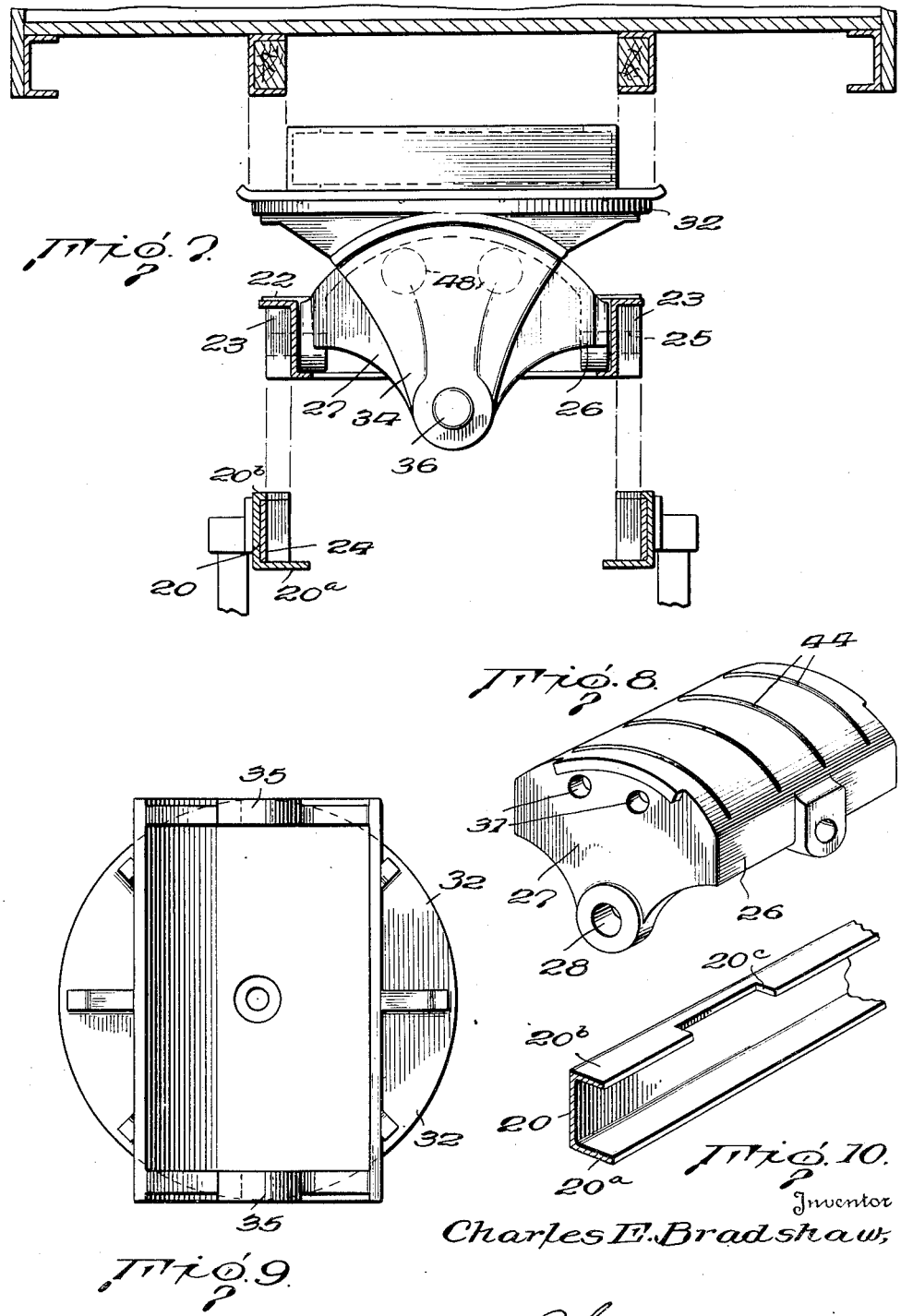

Patented Sept. 8, 1936

2,053,812

UNITED STATES PATENT OFFICE 2,053,812

CONNECTION MECHANISM FOR TRACTORS AND TRAILERS

Charles E. Bradshaw, Wellville, Va., assignor of one-third to Charles Martin, Wellville, Va.

Application March 18, 1936, Serial No. 69,561

16 Claims. (Cl. 280—33.1)

This invention relates to an improved form of connection for use between a tractor and a trailer or other vehicle drawn by the tractor.

One object of the present invention is to provide a connection mechanism of this type which will be formed of a comparatively few sturdy parts whereby it will sustain the loads or stresses imposed upon it without undue wear or the necessity of repairs.

A further object is to provide a connection mechanism of this type which will accommodate itself to all irregularities in the roadway over which the tractor and vehicle drawn thereby pass. More specifically, the connection mechanism will compensate for any and all vertical or lateral deviations in the roadway, the mechanism being capable of rocking in vertical planes both longitudinally and transversely of the roadway and the trailer or other drawn vehicle being secured to the connection by a swivel whereby curves in a roadway will be compensated for.

Another object is the provision of a connection mechanism which may be assembled on the chassis or main frame of the tractor at a comparatively low point whereby the forward end of the trailer need not be unduly elevated.

A still further object of the invention is to provide a connection mechanism having what might be termed "draft rigging", whereby strains or stresses set up by relative movements of the tractor and trailer toward and from each other will be gradually absorbed, thus eliminating the imposition of severe shocks on the trailer and tractor frames.

Another object is the provision of a connection mechanism which may be preliminarily assembled as a unit and subsequently, in this unitary form, installed on the main frame or chassis of the tractor.

With these and other objects in view, the invention consists in certain details of construction and combinations and arrangements of parts, all as will hereinafter be more fully described and the novel features thereof particularly pointed out in the appended claims.

In the accompanying drawings—

Fig. 7 is a vertical sectional view transversely of the tractor and trailer frames with the connection mechanism interposed therebetween, but disassembled therefrom to illustrate the installation of the connection as a unitary structure onto the tractor chassis;

Fig. 8 is a perspective view of the lower member of the connection mechanism;

Fig. 9 is a bottom plan view of the turntable or upper member of the connection mechanism; and Fig. 10 is a perspective view of a portion of one of the side members of the tractor chassis.

Figure 1:
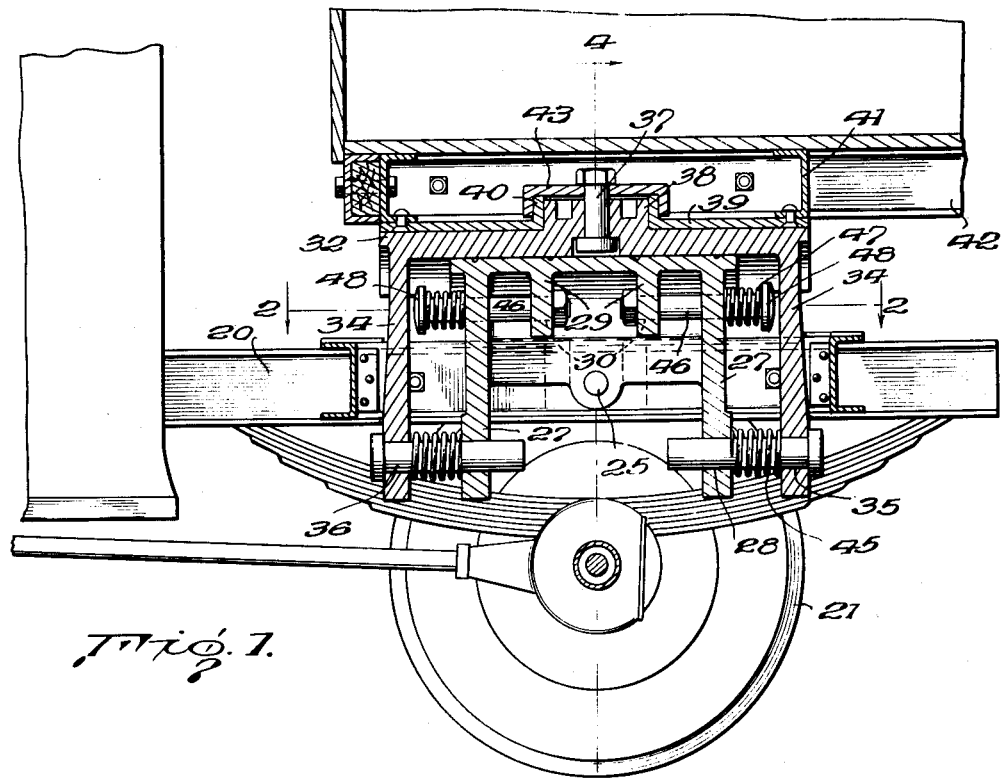
Figure 1 is a vertical section taken longitudinally of the trailer and truck frames, illustrating the preferred embodiment of the present connection.
Figure 2:
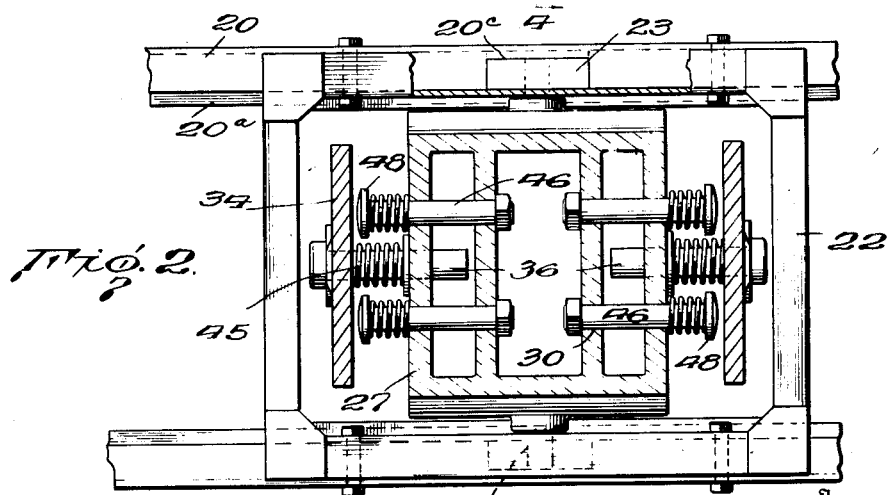
Fig. 2 is a transverse horizontal section on the line 2—2 of Fig. 1.
Figure 4:
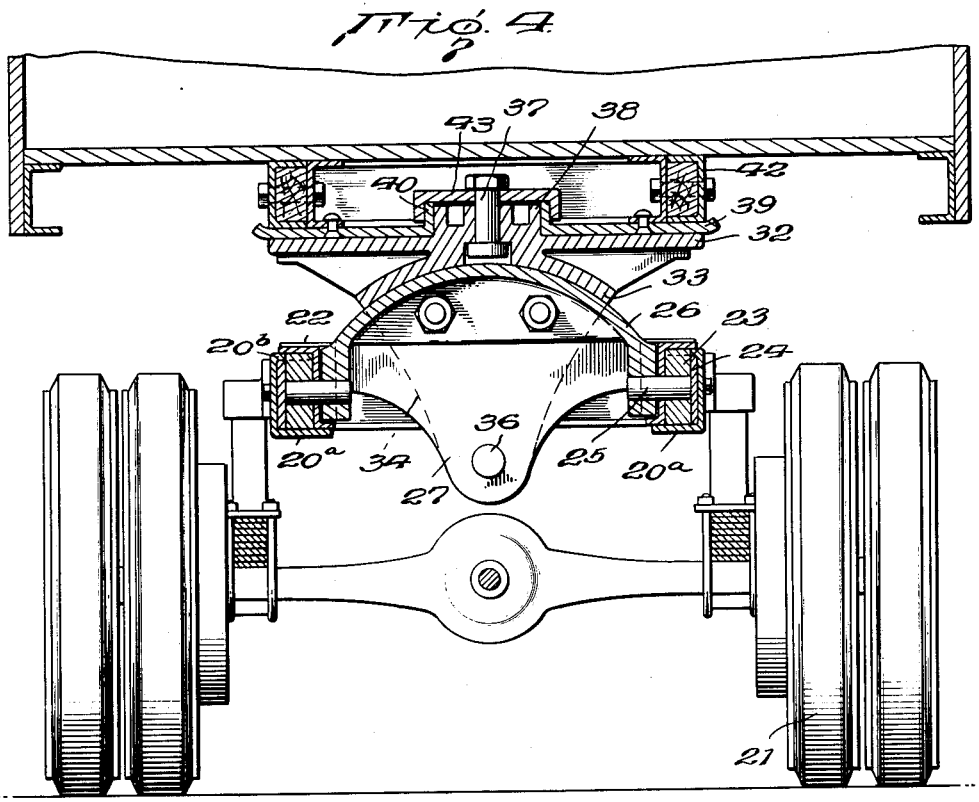
Fig. 4 is a transverse vertical section on the line 4—4 of Fig. 1.
Figure 3:
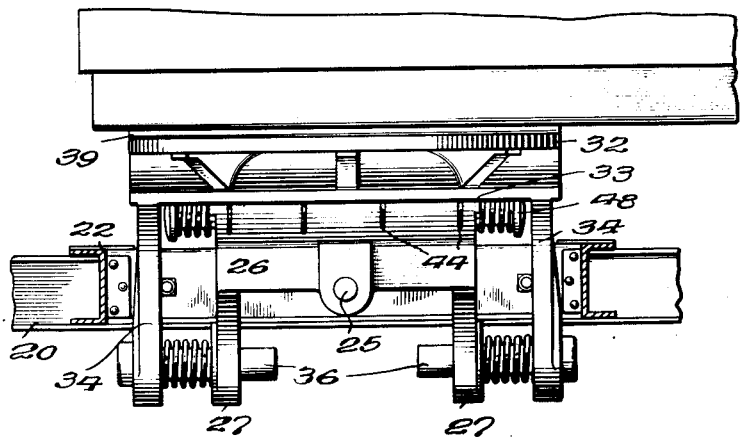
Fig. 3 is a side elevational view of the present connection, with portions of the tractor and trailer frames illustrated.

The main side members 20 of the tractor chassis are supported in the usual manner from the ground wheels 21, said side members in present-day constructions usually being of channel formation having a lower flange 20$^a$ of somewhat greater width than the upper flange 20$^b$, as illustrated more particularly in Figs. 4, 7, and 10. In order that the present connection may be installed on these side members of the tractor chassis as a unit, said mechanism comprises a rectangular frame 22, the side members of said frame being of Z-shape in cross-section. The connection proper is supported in the frame 22 by pivot pins 25 which pass through the lower member 26 of the connection, the webs of said Z-members, and blocks 23, which may be of any desired material. When the connection is to be installed, the frame carrying the connection is lowered into place on the side members 20 of the tractor chassis, the upper flanges of said members 20 being cut away as at 20$^c$ to accommodate the blocks 23. If desired, liners 24 may be interposed between the blocks 23 and the webs of channel members 20. As will be observed in Fig. 4, the lower extremity of the Z-shaped side members of frame 22 and the blocks 23 rest on the upper surface of lower flange 20$^a$ of the chassis members. This mode of assembly is clearly illustrated in Fig. 7 where the connection, as a unit, is shown in spaced relation to the chassis of the tractor and the frame of the trailer is illustrated vertically spaced from the connection mechanism. As indicated by the dot and dash line in this Fig. 7, the connection mechanism is first lowered onto the side members of the tractor chassis and the trailer then imposed on the upper portion of the connection mechanism, after which the swivel connection between the trailer and connection mechanism will be made, as will hereinafter be more fully described.

In the preferred form of connection illustrated in Figs. 1 to 4, the lower member 26 is a casting having depending end portions 27, each formed at its lower extremity with a bearing 28 and the upper surface of said casting is of convex formation transversely of the vehicle. On the under, or concave, surface of said member, there are also one or more ribs or lugs 29 having openings 30 therein, said openings being arranged in registry with openings 31 in the end extensions 27. As previously described, this lower member 26 is pivoted on pins 25 in frame 22, said pins being disposed transversely of the vehicle so that member 26 can rock or swing in a vertical plane fore and aft, or longitudinally of the vehicle.

Supported on member 26 and slidable thereon transversely of the vehicle is a turntable 32, said turntable having a portion formed with a concave surface 33 adapted to slide on the convex surface of member 26. Said turntable also has depending end portions 34 formed with bearings 35 and pivot pins 36 extending through the bearings 35 of the turntable and bearings 28 of member 26 pivotally support the turntable to permit this rocking or sliding movement of the turntable transversely of the vehicle on member 26. Formed centrally of the turntable in the upper portion thereof is an opening for a pivot pin or king bolt 37 by means of which the trailer is swiveled to the turntable. In order to eliminate looseness in this connection between the tractor and the turntable, the latter has formed on its upper surface a circular projection 38, the periphery of said projection being concentric with the king bolt 37 and a plate 39, carried by the trailer and supported on the turntable, is formed with an annular flange 40 around an opening in said plate 39 through which projection 38 extends. Flange 40 circumscribes and abuts against projection 38, so that, while plate 39 is free to rotate in a horizontal plane on the surface of the turntable, nevertheless there will be no looseness in the connection between the turntable and the plate 39. As just stated, plate 39 is carried by the trailer, being connected to channel members 41 which, in turn, constitute a frame bolted to the side members 42 of the trailer chassis. Also, if desired, a cap 43 may be secured by the king pin 37 over the opening in plate 39, through which the projection 38 of the turntable extends.

As will be apparent, this form of connection permits the entire connecting mechanism to rock on pins 25 in a vertical plane fore and aft of the vehicles, which rocking movement will compensate for irregularities in the roadway that may cause relative vertical movements of the two vehicles. Likewise, the pivotal connection formed by pins 36 between member 26 and turntable 32 and the interengaging convex and concave surfaces of those two elements will permit a relative rocking movement transversely of the vehicles, and thus compensate for irregularities that might occasion a rocking of one vehicle with respect to the other. Finally, the swivel connection formed by king pin 37 will permit a relative rotary movement of one vehicle with respect to the other in a horizontal plane, as, for instance, occurs when the tractor and trailer progress around a curve in a winding road. A casual inspection also shows that the entire mechanism is of sturdy, durable construction, being capable of withstanding excessive wear and not likely to be broken or fractured by strains or shocks imposed upon it.

To reduce wear on relatively moving parts and, particularly, the upper surface of member 26 and the turntable, the surfaces of these portions may be provided with grease-retaining recesses such as indicated at 44. Also, to reduce shocks or strains that would normally be transmitted to the connection, should there be a tendency of the tractor and trailer to move relatively to one another, the turntable and member 26 are free to slide relatively to one another longitudinally of the vehicles and, in addition, means are provided for yieldingly resisting such longitudinal relative movement of these parts. For this reason, pivot pins 36 are loose, so to speak, in their bearings in the depending portions 27 and 34 of member 26 and turntable 32, and springs 45 are carried on said pivot pins between said depending portions. The pins 36, being loose in their bearings, permit members 26 and 32 to move relatively to one another longitudinally of the vehicles and the interposition of springs 45 causes such relative movement to be resisted. It will be apparent, of course, that these springs represent, so to speak, only one form of means that might be used for resisting such relative longitudinal movements. To supplement the action of springs 45, additional pins 46 may be mounted in openings 30, in projections 29, and in corresponding openings in extensions 27 of member 26 and springs 47 secured on the ends of said pins 46 which extend into the space between extensions 27 of member 26 and extensions 34 of the turntable. These protruding ends of pins 46 are formed with heads 48 to retain springs 47 thereon and the heads 48 may be spaced somewhat from the extensions 34 of the turntable, so that, in actual practice, relative longitudinal movement of the turntable and member 26 will first partially compress one of springs 45 depending upon the direction of relative movement, and then compress one of the springs 47, the cumulative resistance of the two sets of springs offering sufficient resistance to such relative movement as to prevent the imposition of undue strains or stresses on the other structural parts of the connection.

Figure 5:
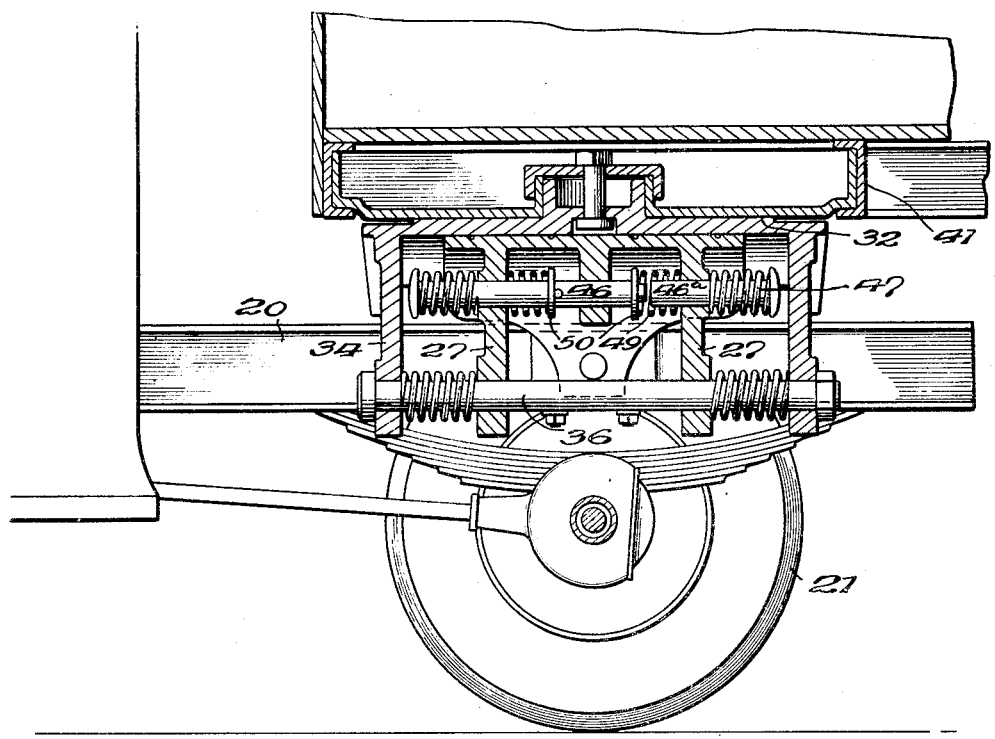
Fig. 5 is a view corresponding to Fig. 1, but illustrating a modified form of the invention.
Figure 6:
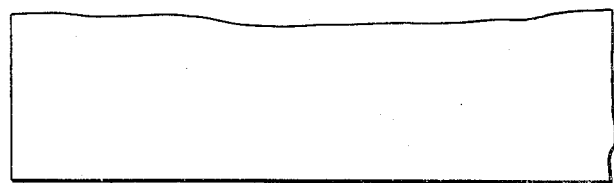
Fig. 6 is a side elevational view of the connection illustrated in Fig. 5.

In the modified form of construction illustrated in Figs. 5 and 6, only one pivot pin 36 is used, said pin extending the full distance between the two end extensions of the turntable. Similarly, a sectional pin 46, 46ª, so-called, may be used for the supplemental springs 47, and, if desired, additional springs 49 may be provided on the sections of pin 46, 46ª, these additional springs being interposed between the extensions 27 of member 26 and collars or annular flanges 50 on the pin section 46.

Referring, again, to Figs. 1 and 2, a detail description of the action of the several springs will be given for purposes of clarity. Assuming there is a tendency of the tractor chassis to move longitudinally away from the trailer, extension 27, at the left end of member 26, as viewed in these figures, will compress the spring 45 on pin 36 at the left of said figures, and, after this spring has been partially compressed, the heads 48 on pins 46 at the left of said figures, will contact extension 34 at the left end of turntable 32 whereupon springs 47 at the left, or forward, end of the connection will be compressed. Similarly, if there is a tendency of the trailer to move longitudinally relatively toward the tractor, the springs 45, 47, at the right of Figures 1 and 2, or what might be termed the rear end of the connection, will come into place, successively, in the manner just described.

Summarizing, the invention may be said to consist essentially of an upper member secured to the trailer; a lower member pivotally mounted on the chassis of the tractor; and a third intermediate member pivotally connecting the aforesaid two members, said intermediate member and either the upper or lower member having extended bearing surfaces formed independently of the pivotal connections, which bearing surfaces are adapted to slide on each other laterally of the vehicles, and all three of said members constituting a fully universal coupling between the two vehicles. This so-called upper member fixed to the trailer, in the form of the invention illustrated in the present instance, is the plate 39, and the lower member is the convex casting 26, while the intermediate member is the turntable 32.

What I claim is:

1. In a connection mechanism for a tractor and a vehicle, the combination of a lower member pivoted on the tractor for movement in a vertical plane fore and aft of the tractor, a second member pivoted on said lower member and slidable thereon in an arcuate path transversely of the tractor, and a swivel connection between said second member and said trailer.

2. In a connection mechanism for a tractor and a vehicle, the combination of a lower member pivoted on the tractor for movement in a vertical plane fore and aft of the tractor, a second member pivoted on said lower member and slidable thereon in an arcuate path transversely of the tractor, and a swivel connection between said second member and said trailer, said lower member and said second member being movable relatively to each other longitudinally of the tractor and trailer.

3. In a connection mechanism for a tractor and a vehicle, the combination of a lower member pivoted on the tractor for movement in a vertical plane longitudinally of the tractor, a plate slidable on said member longitudinally of the tractor and in an arcuate path laterally of the tractor, and a swivel connection between said plate and trailer.

4. In a connection mechanism for a tractor and a trailer, the combination of a lower member pivoted on the tractor for pivotal movement in a vertical plane longitudinally of the tractor, depending extensions on said member, a plate pivotally supported on said extensions to rock laterally of said tractor, said member and plate having arcuate surfaces disposed transversely of the tractor slidable relatively to each other, a turntable formed on said plate, and a swivel connection between said turntable and tractor.

5. In a connection mechanism for a tractor and a trailer, the combination of a lower member pivoted on the tractor for pivotal movement in a vertical plane longitudinally of the tractor, said member having a convex upper surface disposed transversely of the tractor, a plate having a concave surface slidable on the convex surface of said member laterally of the tractor, a turntable supported on said plate, and a swivel connection between said plate and trailer.

6. In a connection mechanism for a tractor and a trailer, the combination of a lower member pivoted on the tractor for pivotal movement in a vertical plane longitudinally of the tractor, said member having a convex upper surface disposed transversely of the tractor, a plate having a concave surface slidable on the convex surface of said member laterally and longitudinally of the tractor, and a swivel connection between said plate and trailer.

7. In a connection mechanism for a tractor and and a trailer, the combination of a lower member pivoted on the tractor for pivotal movement in a vertical plane longitudinally of the tractor, said member having a convex upper surface disposed transversely of the tractor, a plate having a concave surface slidable on the convex surface of said member laterally and longitudinally of the tractor, means for yieldingly resisting relative longitudinal movement of said member and plate.

8. In a connection mechanism for a tractor and a trailer, the combination of a lower member pivoted on the tractor for pivotal movement in a vertical plane longitudinally of the tractor, said member having a convex upper surface disposed transversely of the tractor, a plate having a concave surface slidable on the convex surface of said member laterally and longitudinally of said tractor, and means for supporting the trailer on said plate for rotary movement in a horizontal plane.

9. In a connection mechanism for a tractor and a trailer, the combination of a lower member pivotally mounted on the tractor for rocking movement in a vertical plane force and aft of the tractor, depending extensions on said member, said member having a convex surface disposed laterally of the tractor, a plate having a concave surface slidable laterally of the tractor on the convex surface of said member, said convex and concave surfaces being movable relatively to each other longitudinally of the tractor, depending extensions on said plate, means interposed between the extensions of said plate and member for yieldingly resisting relative longitudinal movements of said plate and member and means on said plate for rotatably supporting the trailer.

10. In a connection mechanism for a tractor and a trailer, the combination of a lower member pivoted on the tractor for rocking movement in a vertical plane fore and aft of the tractor, a plate, depending extensions on said member and plate, a pivotal connection between the extensions of said member and those of the plate to permit rocking movement of said plate laterally of the tractor, said plate being slidable on said member longitudinally of the tractor, means carried by said pivotal connection between said extensions for yieldingly resisting longitudinal movement of said plate, and means for supporting the trailer on said plate for rotary movement in a horizontal plane.

11. In a connection mechanism for a tractor and a trailer, the combination of the main side members of the tractor chassis, an open frame mounted on said side members, a member pivoted in said frame for rocking movement in a vertical plane fore and aft of the tractor, said member having an arcuate surface extending laterally of the tractor, a plate slidably supported on said member and pivotally attached to said member for rocking movement on the arcuate surface of said member laterally of the tractor, and means on said plate for supporting a trailer for rotary movement in a horizontal plane, said frame, together with the mechanism supported thereby, being mounted as a unit on the tractor chassis.

12. In a connection mechanism for a tractor and a trailer, the combination of a unitary connection assembly mounted on the tractor, said assembly comprising a rectangular frame, a member pivotally mounted in said frame for rocking movement in a vertical plane relatively to the tractor, a plate slidably supported on said member and pivotally attached to said member for rocking movement in a vertical plane at right angles to the plane of movement of said member, and means on said plate for supporting the trailer for rotary movement in a horizontal plane.

13. In a connection mechanism for a tractor and a trailer, the combination of a unitary connection assembly mounted on the tractor, said assembly comprising a rectangular frame, a member pivotally mounted in said frame for rocking movement in a vertical plane relatively to the tractor, a plate slidably supported on said member and pivotally attached to said member for rocking movement in a vertical plane at right angles to the plane of movement of said member, and a swivel connection between said plate and trailer.

14. In a connection mechanism for a tractor and a trailer, the combination of a unitary connection assembly mounted on the tractor, said assembly comprising a rectangular frame, a member pivotally mounted in said frame for rocking movement in a vertical plane relatively to the tractor, a plate slidably supported on said member and pivotally attached to said member for rocking movement in a vertical plane at right angles to the plane of movement of said member, a turntable formed on said plate, and a swivel connection between said turntable and trailer.

15. In a tractor-trailer connection unit, a fifth-wheel coupling comprising an upper member secured to one vehicle, a lower member pivoted to the other vehicle, and an intermediary member pivotally connecting said two members together, said lower member and said intermediary member having bearing surfaces formed independently of said pivotal connections, said bearing surfaces being slidable on each other, the three members constituting a fully universal coupling between the two vehicles.

16. In a tractor-trailer connection unit, a fifth-wheel coupling comprising an upper member secured to one vehicle, a lower member pivoted to the other vehicle, and an intermediary member pivotally connecting said two members together, said intermediary member and one of said other members having bearing surfaces formed independently of said pivotal connections, said bearing surfaces being slidable on each other, the three members constituting a fully universal coupling between the two vehicles.

CHARLES E. BRADSHAW.